(12) United States Patent
Maxwell et al.

(10) Patent No.: US 6,572,762 B2
(45) Date of Patent: Jun. 3, 2003

(54) SUPPLEMENTAL BILGE FILTRATION SYSTEM

(75) Inventors: Martin C. Maxwell, Ripon, CA (US); Robin B. MacDonald, Hughson, CA (US); Jeffrey A. Fulan, Modesto, CA (US); Gary A. Garcia, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/057,235

(22) Filed: Jan. 25, 2002

(65) Prior Publication Data

US 2002/0104796 A1 Aug. 8, 2002

Related U.S. Application Data

(60) Provisional application No. 60/266,914, filed on Feb. 7, 2001.

(51) Int. Cl.$^7$ .............................. C02F 1/40; B01D 27/00
(52) U.S. Cl. ..................... 210/90; 210/104; 210/121; 210/258; 210/416.1
(58) Field of Search ........................... 210/86, 99, 104, 210/121, 170, 252, 258, 90, 416.1, 443, 444, 908, 924, 693, 741, 744

(56) References Cited

U.S. PATENT DOCUMENTS

| 3,836,000 | A | | 9/1974 | Jakubek |
| 3,911,938 | A | | 10/1975 | Wiltrout |
| 3,913,513 | A | | 10/1975 | Pedone |
| 3,937,662 | A | * | 2/1976 | Bartik ......................... 210/649 |
| 3,966,603 | A | * | 6/1976 | Grant ........................... 210/86 |
| 4,038,189 | A | * | 7/1977 | Dison et al. .................. 210/90 |
| 4,139,463 | A | | 2/1979 | Murphy et al. |
| 5,160,444 | A | * | 11/1992 | McFarland ................... 210/805 |
| 5,328,598 | A | * | 7/1994 | Lohrl et al. .................... 210/93 |
| 5,350,527 | A | | 9/1994 | Kitko |
| 5,401,404 | A | | 3/1995 | Strauss |
| 5,474,672 | A | | 12/1995 | Peterson et al. |
| 5,603,825 | A | | 2/1997 | Costinel |
| 5,609,760 | A | * | 3/1997 | Leach ....................... 210/416.1 |
| 5,747,672 | A | | 5/1998 | Parent et al. |
| 5,833,862 | A | * | 11/1998 | Holland ....................... 210/690 |
| 6,027,653 | A | * | 2/2000 | Holland ....................... 210/690 |
| 6,056,881 | A | | 5/2000 | Miller et al. |
| 6,207,065 | B1 | * | 3/2001 | Brown ........................ 210/769 |

FOREIGN PATENT DOCUMENTS

| DE | 32 22 176 A1 | 11/1983 |
| DE | 36 17 599 A1 | 11/1987 |

* cited by examiner

Primary Examiner—Fred Prince
(74) Attorney, Agent, or Firm—Christopher H. Hunter

(57) ABSTRACT

A discharge water system for the bilge of a boat includes a primary bilge discharge system and a supplemental bilge filtration system. The primary discharge system includes a pump operable when the fluid in the bilge collects above a predetermined level in the boat to discharge bilge water overboard. The supplemental system includes a filter assembly with filter media for removing hydrocarbons in bilge water passing through the media; and a pump operable when the water in the bilge collects to a selected level below the operating level "L" of the primary pump to pump bilge water to the filter assembly and then to discharge the essentially hydrocarbon-free bilge water overboard. The filter assembly includes primary secondary filter cartridge, both of which include hydrocarbon-absorbing media, and are connected in series. A pressure sensor and remote indicating device provide an indication of the primary filter cartridge becoming spent.

10 Claims, 2 Drawing Sheets

SUPPLEMENTAL BILGE FILTRATION SYSTEM

CROSS-REFERENCE TO RELATED CASES

The present application claims the benefit of the filing date of U.S. Provisional Application Ser. No. 60/266,914; filed Feb. 7, 2001.

FIELD OF THE INVENTION

The present invention relates generally to filter systems, and particularly to a filter system for bilge water in pleasurecraft.

BACKGROUND OF THE INVENTION

As is well known in the boating industry, tough new governmental regulations prevent the discharge of even small amounts of hydrocarbons (gasoline, diesel fuel, lubrication, hydraulic and synthetic oils, etc.) into the surrounding rivers, lakes and waterways. This becomes an issue for disposing of bilge water, which of course must be removed from the bilge of the boat on a constant basis. The oils and fuels can drain into the bilge, and contaminate the water. The oils and fuels must be removed before the bilge water is pumped overboard, to avoid fouling the environment and the payment of stiff fines.

The discharge water system for a boat typically includes a primary bilge discharge system. The primary bilge discharge system conventionally includes a pump operable when the water in the bilge collects above a predetermined level. The pump is connected by plumbing to an outlet port in the boat hull to discharge the bilge water overboard. A float switch or other mechanical or electrical device sends a command signal to operate the pump when the water collects in the bilge above the predetermined level. While this system may have been appropriate in the past, as indicated above, this is unallowable in light of the new governmental regulations, at least without cleansing the discharge effluent before it is pumped overboard.

Various systems are known for removing at least some of the hydrocarbons in bilge water before the bilge water is pumped overboard. It is believed most known systems are complicated and/or expensive, and are designed as a primary discharge system (that is, are installed as original equipment). This does not assist particularly the small pleasurecraft owner, with limited funds, and an existing bilge discharge system, from meeting the new governmental regulations. As such, it is believed there exists a need for a simple, relatively inexpensive, supplemental bilge filtration system, which can be installed in conjunction with the primary discharge system, to remove hydrocarbons in bilge water before the bilge water is pumped overboard.

SUMMARY OF THE PRESENT INVENTION

The present invention provides a novel and unique supplemental bilge filtration system for the discharge water filtration system on a boat. The system is simple, relatively inexpensive, and can be installed in conjunction with the primary discharge system, to effectively remove hydrocarbons in bilge water before the bilge water is pumped overboard.

The supplemental bilge filtration system of the present invention includes a filter assembly with filter media for removing hydrocarbons in bilge water passing through the media; and a pump operable when the water in the bilge rises to a level below the level which operates the primary bilge discharge system. The pump for the supplemental bilge filtration system forces the bilge water through the filter assembly, and then through plumbing connected to an outlet port in the hull of the boat. The supplemental bilge filtration system discharges essentially hydrocarbon-free bilge water from the boat.

The pump for the supplemental bilge filtration system is operable upon receipt of a command signal to pump bilge water through the media in the filter assembly. A float switch or other mechanical or electrical device is provided to send the command signal to the pump when water in the bilge collects to the level below the predetermined level.

The filter assembly for the supplemental bilge filtration system preferably includes a primary filter element and a secondary filter element. The elements include hydrocarbon-absorbing media, and are connected in series. The elements are preferably replaceable. A pressure switch connected to a remote indicating device provides an indication to the operator when the primary filter element becomes clogged or spent. The switch also shuts down the pump for the supplemental bilge filtration system to avoid hydrocarbon discharge.

The primary bilge discharge system can remain operable as a redundant bilge water discharge system for the boat.

Further features of the present invention will become apparent to those skilled in the art upon reviewing the following specification and attached drawings.

DETAILED DESCRIPTION OF THE PREFERRED EMBODIMENT

Figure 1:
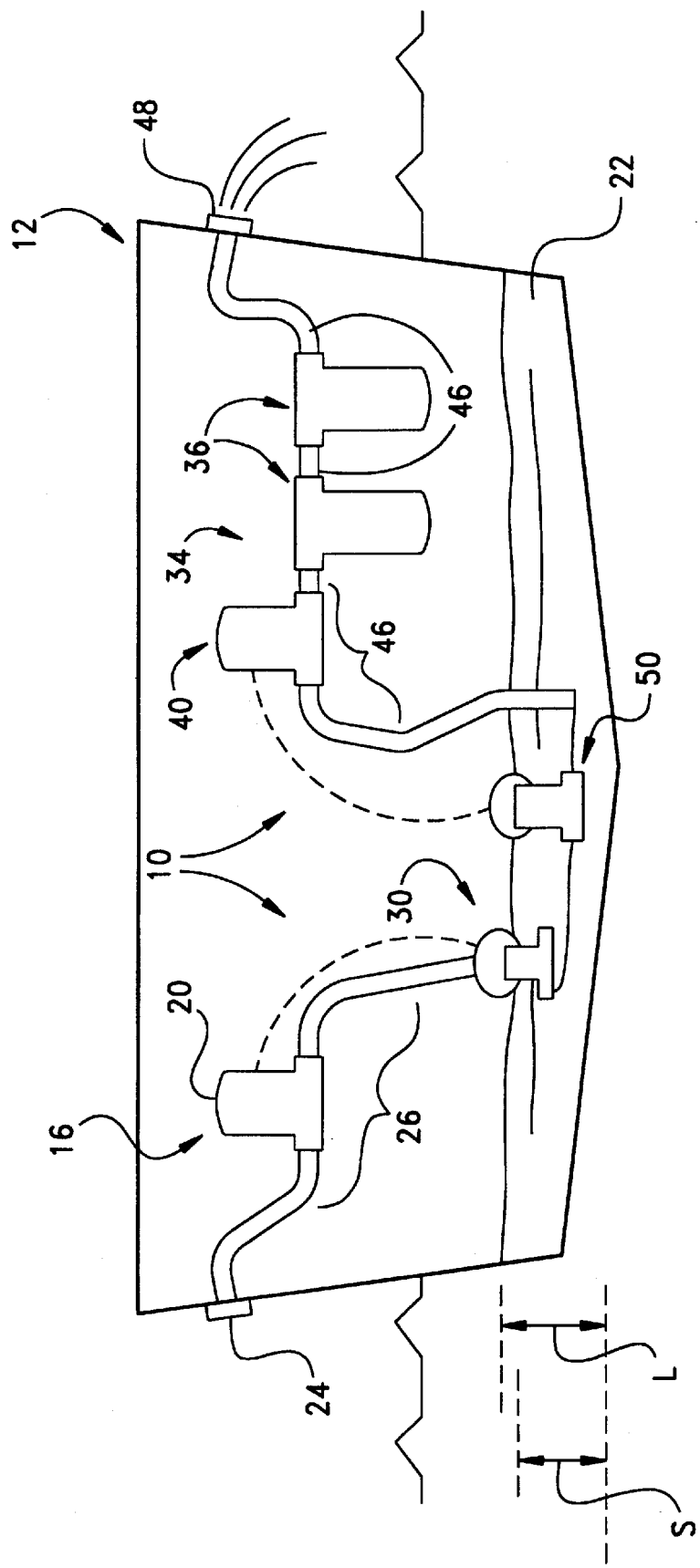
FIG. 1 is a schematic illustration of a discharge water system with a supplemental bilge filtration system constructed according to the principles of the present invention.

Referring initially to FIG. 1, a discharge water system, indicated generally at 10, is shown for a boat, indicated generally at 12. The discharge water system for the boat conventionally includes a primary bilge discharge system, indicated generally at 16. The primary bilge discharge system conventionally includes a primary pump 20 operable when the fluid in the bilge 22 of the boat collects above a predetermined level "L". The pump is fluidly connected by primary plumbing (hose or tubing) 26 to the bilge 22 and to a primary outlet port 24 in the boat hull.

A primary float switch or other mechanical or electrical device is indicated at 30, and provides a command signal to pump 20 when the level of water in the bilge 22 rises above the predetermined level "L". The pump operates to discharge the water overboard until the water level falls below the predetermined level.

The primary bilge discharge system described above is conventional with pleasure boats, should be well-understood by those of ordinary skill in the art, and will not be described further for sake of brevity. The present invention is intended to be used with the primary bilge discharge system described above, as well as with any other discharge system installed in boats as original equipment or as aftermarket equipment. The present invention is not intended to be used as a primary bilge discharge system, however it should be appreciated that the principles of the present invention may be readily applied to such a primary bilge discharge system.

In any case, the present invention is directed to a supplemental bilge filtration system, indicated generally at 34. The supplemental bilge filtration system includes a filter assembly, indicated generally at 36, for removing hydrocarbons in bilge water passing through the assembly; and a supplemental pump, indicated generally at 40, operable when the water in the bilge collects to a selected level "S" below the predetermined level "L". The pump 40 for the supplemental bilge filtration system is fluidly connected by supplemental plumbing (hosing or tubing) 46 to the bilge 22 and to a second outlet port 48 in the boat hull.

The pump 40 for the supplemental bilge filtration system is conventional in design, and chosen to deliver an appropriate volume of bilge water from the boat. For most pleasure boat applications, it is believed a 100 gph pump will be sufficient. Bilge pumps appropriate for this particular application are widely commercially available, and are easily installed within the electrical system of the boat. The pump can be attached to an appropriate location in the boat using conventional support brackets. The plumbing 46 is also conventional, and widely commercially available.

The pump 40 is operable upon receipt of a command signal to pump bilge water through the filter assembly. A second float switch or other conventional mechanical or electrical device 50 is provided to send the command signal to the pump. The second switch is set at a level "S" slightly below the level "L" of switch 30, so that the second pump 40 is operable when water in the bilge collects to a level somewhat below the predetermined level "L".

Figure 2:
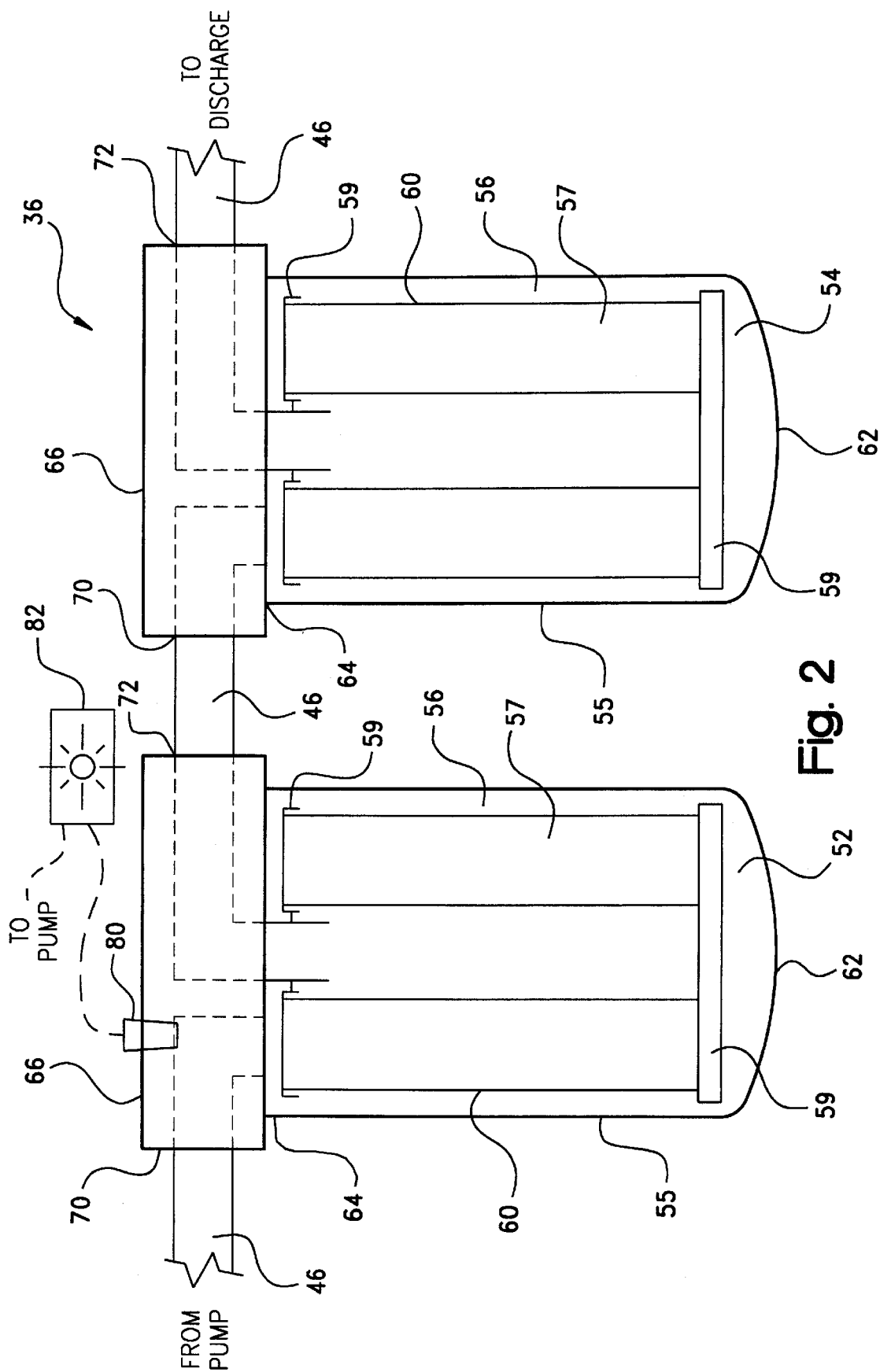
FIG. 2 is a cross-sectional view of the filter cartridges for the supplemental bilge filtration system.

As shown in FIG. 2, the filter assembly 36 for the supplemental bilge filtration system preferably includes a primary filter cartridge 52 and a secondary filter cartridge 54. The cartridges are preferably identical for ease of manufacture and assembly, and each includes a housing 55 enclosing a replaceable filter element 56. The filter element 56 preferably comprises a ring of hydrocarbon-absorbing, modified polymer media 57. Annular end caps 59 are attached (bonded such as with adhesive) to each end of the media ring. The cartridges are preferably connected in series, with the primary cartridge 52 receiving flow from the pump before the secondary cartridge 54.

The elements are preferably replaceable. To this end, each cartridge preferably includes a cylindrical body 60 with a closed end 62 and an open end 64. A cover 66 is removably attached to the open end of the body such as with cooperating threads. Each cover 66 includes inlet and outlet ports 70, 72, which direct flow into and out of the housing at appropriate locations, such that the bilge water flows through the media 57. Preferably the flow enters the peripheral region of the body, and flows radially inward and then axially outward to the outlet port, however, it should be appreciated that the flow could alternatively be radially-outward through the media, with the inlet and outlet ports switched. To minimize costs, the body and cover of the housing are preferably formed from plastic (e.g., polypropylene).

The choice of media and the design of the filter cartridges and elements can take many forms, and there are a wide variety of forms known to those skilled in the art that would be appropriate for these applications. An appropriate high-efficiency filter media which absorbs substantial hydrocarbons in a fluid stream is available form the assignee of the present invention under the mark/designations OILBLOC™ and TRUBIND™. Such media is a modified polymer, and absorbs hydrocarbons to a level below 15 parts per million (PPM). The modified polymer absorbs and binds the hydrocarbons molecules into the interior matrices. The polymer is formulated to control the speed of hydrocarbon absorption by eliminating the potential for skin formation at the polymer/hydrocarbon interface.

Other appropriate hydrocarbon-absorbing medias are commercially available and are described for example, in U.S. Pat. Nos. 5,474,672; 5,603,825; 3,913,513; and 3,836,000. While a pair of filter elements are preferred for redundancy purposes and to ensure full compliance with governmental standards, it is possible that only a single filter element may be used in certain applications.

A pressure switch 80 in the primary cartridge 52 connected to a remote visual indicating device 82 (mounted for example, on the console) provides an indication to the operator when the primary filter element becomes clogged or spent. The switch 80 is also connected to the pump and preferably shuts down the pump 40 to avoid hydrocarbon discharge above the 15 PPM level.

As described above, the supplemental bilge filtration system operates at a bilge water level somewhat below the operating level of the primary bilge discharge system. The causes contaminated bilge water to pass through the supplemental bilge filtration system and be cleansed of hydrocarbon impurities. The system then discharges essentially hydrocarbon-free bilge water from the boat.

The primary bilge discharge system 16 is preferably maintained in operating condition, and can remain as a redundant bilge water discharge system.

The present invention is particularly suited for smaller pleasure boats, however, it should be appreciated that the present invention is well-suited to boats (or ships) of any size.

Thus, as described above, the present invention provides a novel and unique supplemental bilge filtration system for the discharge water filtration system on a boat. The system is simple, relatively inexpensive, and can be installed in conjunction with the primary discharge system, to effectively remove hydrocarbons in bilge water before the bilge water is pumped overboard.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A supplemental bilge filtration system, operable in conjunction with a primary bilge water discharge system in the bilge of a boat, the supplemental bilge filtration system comprising:

a filter assembly including filter media for removing hydrocarbons in bilge water passing through the media, the filter assembly including a primary and a secondary filter cartridge fluidly connected in series, with the primary filter cartridge located upstream from the secondary filter cartridge;

a pump fluidly connected to the filter assembly and which can be fluidly connected to the bilge and operable upon receipt of a command signal to pump bilge water through the media;

a switch communicating with the pump and sending a signal when water in the bilge collects to a selected level;

plumbing for fluidly connecting the filter assembly with an outlet port for discharging essentially hydrocarbon-free bilge water from the boat; and a pressure sensor and a remote indicating device communicating with the filter assembly and providing an indication of the filter assembly becoming clogged or spent.

2. The supplemental bilge filtration system as in claim 1, wherein each filter cartridge includes a filter housing and a filter element, the filter housing and element having a structure such that the element can be removed from the housing when spent and replaced with a fresh element.

3. A supplemental bilge filtration system, operable in conjunction with a primary bilge water discharge system in the bilge of a boat, the supplemental bilge filtration system comprising:

a filter assembly including filter media for removing hydrocarbons in bilge water passing through the media;

a pump fluidly connected to the filter assembly and which can be fluidly connected to the bilge and operable upon receipt of a command signal to pump bilge water through the media;

a switch communicating with the pump and sending a signal when water in the bilge collects to a selected level;

plumbing for fluidly connecting the filter assembly with an outlet port for discharging essentially hydrocarbon-free bilge water from the boat; and a pressure sensor and a remote indicating device communicating with the filter assembly, wherein the filter assembly includes a primary and a secondary filter cartridge fluidly connected in series, with the primary filter cartridge initially receiving flow from the pump before the secondary filter cartridge, the pressure sensor and remote indicating device providing an indication of the primary filter cartridge becoming clogged or spent.

4. A discharge water system for the bilge of a boat, the discharge water system comprising:

a primary bilge discharge system including a first pump fluidly connected with the bilge and operable when water in the bilge collects above a predetermined level in the boat to pump water overboard to pump bilge water through primary plumbing to a primary outlet port; and a supplemental bilge filtration system including a filter assembly including filter media for removing hydrocarbons in bilge water passing through the media, the filter assembly including a primary and a secondary filter cartridge fluidly connected in series, with the primary filter cartridge connected upstream from the secondary filter cartridge; a second pump fluidly connected to the bilge and to the filter assembly and operable when the water in the bilge collects to a level below the predetermined level to pump bilge water to the filter assembly; and secondary plumbing fluidly connecting the filter assembly with a secondary outlet port for discharging essentially hydrocarbon-free bilge water overboard, and further including a pressure sensor and a remote indicating device communicating with the filter assembly, and providing an indication of the filter media becoming clogged or spent.

5. The discharge water system as in claim 4, and further including a first float switch operatively connected to the first pump to operate the first pump when the water in the bilge collects above the predetermined level, and a second float switch operatively connected to the second pump to operate the second pump when the water in the bilge collects to the level below the predetermined level.

6. The discharge water system as in claim 4, wherein each filter cartridge includes a filter housing and a filter element, the filter housing and element having a structure such that the element can be removed from the housing when spent and replaced with a fresh element.

7. A discharge water system for the bilge of a boat, the discharge water system comprising:

a primary bilge discharge system including a first pump fluidly connected with the bilge and operable when water in the bilge collects above a predetermined level in the boat to pump water overboard to pump bilge water through primary plumbing to a primary outlet port; and a supplemental bilge filtration system including a filter assembly including filter media for removing hydrocarbons in bilge water passing through the media; a second pump fluidly connected to the bilge and to the filter assembly and operable when the water in the bilge collects to a level below the predetermined level to pump bilge water to the filter assembly; secondary plumbing fluidly connecting the filter assembly with a secondary outlet port for discharging essentially hydrocarbon-free bilge water overboard; and a pressure sensor and a remote indicating device communicating with the filter assembly, wherein the filter assembly includes a primary and a secondary filter cartridge fluidly connected in series, with the primary filter cartridge initially receiving flow from the second pump before the secondary filter cartridge, the remote indicating device providing an indication of the primary filter cartridge becoming clogged or spent.

8. A discharge water system for the bilge of a boat, the discharge water system comprising:

a primary bilge discharge system including a first pump fluidly connected with the bilge and a first float switch operatively connected to the first pump to operate the first pump when water in the bilge collects above a predetermined level in the boat to pump bilge water through primary plumbing to discharge the bilge water overboard; and a supplemental bilge filtration system including a filter assembly including filter media for removing hydrocarbons in bilge water passing through the media; a second pump fluidly connected to the bilge and to the filter assembly and a second float switch operatively connected to the second pump to operate the second pump when the water in the bilge collects to a level below the predetermined level to pump bilge water to the filter assembly; and secondary plumbing fluidly connecting the filter assembly with a secondary outlet port for discharging essentially hydrocarbon-free bilge water overboard.

9. The discharge system as in claim 8, further including a pressure sensor and a remote indicating device communicating with the filter assembly, and providing an indication of the filter media becoming clogged or spent.

10. The discharge water system as in claim 8, wherein the filter assembly includes a filter cartridge with a filter housing and a filter element, the filter housing and element having a structure such that the element can be removed from the housing when spent and replaced with a fresh element.

* * * * *